US008024295B2

(12) United States Patent
Graziano et al.

(10) Patent No.: US 8,024,295 B2
(45) Date of Patent: *Sep. 20, 2011

(54) METHOD AND APPARATUS FOR ARCHIVING AND UNARCHIVING OBJECTS

(75) Inventors: John Graziano, Redwood City, CA (US); Anders Bertelrud, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 1071 days.

This patent is subject to a terminal disclaimer.

(21) Appl. No.: 11/464,490

(22) Filed: Aug. 14, 2006

(65) Prior Publication Data

US 2007/0067365 A1  Mar. 22, 2007

Related U.S. Application Data

(63) Continuation of application No. 09/569,526, filed on May 12, 2000, now Pat. No. 7,117,293.

(51) Int. Cl.
*G06F 7/00* (2006.01)
*G06F 15/16* (2006.01)
(52) U.S. Cl. ............... 707/641; 711/161; 715/764
(58) Field of Classification Search ............... 707/200, 707/641, 661–999.101, 999.204; 709/201, 709/202, 203; 711/161, 162; 715/764
See application file for complete search history.

(56) References Cited

U.S. PATENT DOCUMENTS

| 5,421,012 | A |   | 5/1995  | Khoyi et al. |
|-----------|---|---|---------|--------------|
| 5,481,718 | A | * | 1/1996  | Ryu et al. ................ 719/316 |
| 5,583,983 | A | * | 12/1996 | Schmitter ................ 717/138 |
| 5,859,978 | A |   | 1/1999  | Sonderegger et al. |
| 5,920,824 | A |   | 7/1999  | Beatty et al. |
| 5,968,121 | A |   | 10/1999 | Logan et al. |
| 5,987,242 | A | * | 11/1999 | Bentley et al. ................ 703/13 |
| 6,023,721 | A | * | 2/2000  | Cummings ................ 709/201 |
| 6,035,303 | A |   | 3/2000  | Baer et al. |
| 6,044,205 | A |   | 3/2000  | Reed et al. |
| 6,154,786 | A | * | 11/2000 | Williamson et al. ........ 719/315 |
| 6,336,122 | B1 | * | 1/2002 | Lee et al. ................ 707/204 |
| 6,446,260 | B1 |   | 9/2002 | Wilde et al. |
| 6,484,247 | B1 | * | 11/2002 | Gendron et al. ............ 711/170 |

(Continued)

FOREIGN PATENT DOCUMENTS

EP   1283477   2/2003

OTHER PUBLICATIONS

Notice of Allowance of U.S. Appl. No. 09/569,526, Jul. 25, 2006 (mailing date), John Graziano, et al.

(Continued)

*Primary Examiner* — Tony Mahmoudi
*Assistant Examiner* — Dennis Truong
(74) *Attorney, Agent, or Firm* — Adeli & Tollen LLP

(57) ABSTRACT

The invention is directed towards methods and apparatuses for archiving and unarchiving objects. Some embodiments of the invention archive and unarchive objects that have global and user settings in multi-user environments. To archive objects, these embodiments identify which object settings are global settings and which settings are user settings. They store the global settings in an archive, and then store the user settings in another archive. To unarchive each object, some embodiments identify the object's settings in one or both archives. These embodiments instantiate the object, and retrieve its settings from the data archives and use the retrieved settings to define the values of the settings of the instantiated object. Some embodiments use key-value coding techniques to retrieve values and load values in an object. Key-value coding allows an archiving or unarchiving process to retrieve and load setting values for an object by using the setting names.

16 Claims, 10 Drawing Sheets

U.S. PATENT DOCUMENTS

| | | | |
|---|---|---|---|
| 6,536,035 | B1 | 3/2003 | Hawkins |
| 6,557,100 | B1 * | 4/2003 | Knutson ........................ 713/100 |
| 6,684,259 | B1 | 1/2004 | Discavage et al. |
| 6,879,989 | B2 | 4/2005 | Cheng et al. |
| 7,117,293 | B1 | 10/2006 | Graziano et al. |
| 2002/0059539 | A1 | 5/2002 | Anderson |
| 2003/0033310 | A1 | 2/2003 | Factor et al. |

OTHER PUBLICATIONS

Notice of Allowance of U.S. Appl. No. 09/569,526, May 12, 2006 (mailing date), John Graziano, et al.

Non-Final Office Action of U.S. Appl. No. 09/569,526, Oct. 7, 2005 (mailing date), John Graziano, et al., now issued US Patent 7,117,293.

Final Office Action of U.S. Appl. No. 09/569,526, Feb. 10, 2005 (mailing date), John Graziano, et al.

Non-Final Office of U.S. Appl. No. 09/569,526, Dec. 31, 2003 (mailing date), Graziano, et al., issued as US Patent 7,117,293.

Updated portions of prosecution history of U.S. Appl. No. 09/569,526, May 10, 2006, Graziano, John, et al., now issued as U.S. Patent 7,117,293.

* cited by examiner

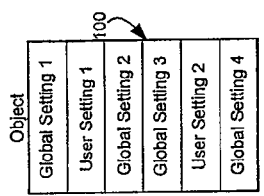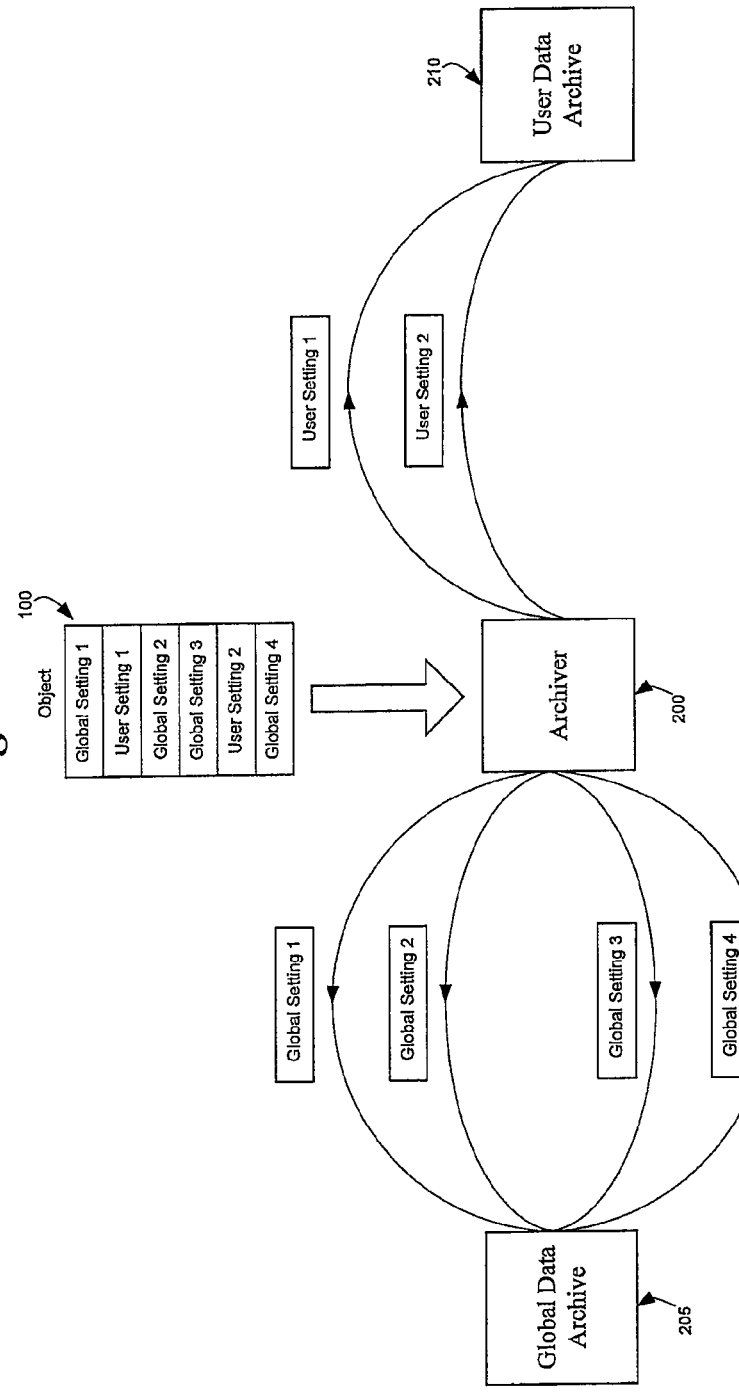

METHOD AND APPARATUS FOR ARCHIVING AND UNARCHIVING OBJECTS

CLAIM OF BENEFIT TO PRIOR APPLICATIONS

This Application is a continuation application of U.S. patent application Ser. No. 09/569,526, filed May 12, 2000, now U.S. Pat. No. 7,117,293, which is incorporated herein by reference.

The present invention is directed towards method and apparatus for archiving and unarchiving objects.

BACKGROUND OF THE INVENTION

Object-oriented programming ("OOP") is a programming technique that creates computer programs by constructing certain objects and creating relationships among and between the objects. An object groups together data attributes and one or more operations that can use or affect the data attributes. The joining of data attributes and operations into a unitary building block is called "encapsulation."

To create objects that have similar data attributes and operations, a class must be defined. A class serves as a template for constructing a group of objects, by providing a general description of the group (i.e., by defining the group's data structure, as well as the operations for supporting the group's defined data structure). An object is often referred to as an instance or instantiation of its class.

In OOP, classes form a "hierarchy." A class can be created through derivation (often called inheritance) from another class. A derived class (called a subclass or a child class) automatically includes all of the characteristics (i.e., data structure and operations) of its ancestor class (called a parent class). Derived classes, however, can add, override, or redefine the inherited data structures and operations of their parent classes.

One type of OOP language is Objective C. In this language, each data unit of an object is referred to as an "instance variable" ("IVAR"), while the objects operations are referred to as "methods." Also, in Objective C, a class is a particular object that describes behavior. Any object that is not a class object is called an instance of its class. In other words, an "instance" is a non-class object that acquires a behavior and has states.

Furthermore, in Objective C, each derived subclass can only add or modify the behavior of its parent class, but it cannot delete the data attributes or methods of its parent. Also, in this language, an object can be instructed to perform one of its methods when it receives a "message." A message typically includes a method selector (i.e., method name) and arguments.

Computer systems often need to archive the data settings of their objects. These systems often use complex archiving techniques to store such data settings. For instance, some prior techniques require each object to include the processing logic for directing its archiving. Consequently, there is a need in the art for a simple archiving method.

Furthermore, there is a need for archiving object-based multi-user documents. A multi-user document is a piece of coherent data (such as a word processing document, a spreadsheet document, etc.) that multiple people create or edit. Such documents typically include objects that have global and user settings. Global settings are settings that are uniformly (i.e., globally) defined for all users, whereas user settings are settings that are uniquely defined for each user.

SUMMARY OF THE INVENTION

The invention is directed towards methods and apparatuses for archiving and unarchiving objects. Some embodiments of the invention archive and unarchive objects that have first and second types of settings (e.g., global and user settings in multi-user environments). To archive each object, these embodiments initially identify which object settings are of the first type and which object settings are of the second type. They then store the first-type settings in a first data archive, and then store the second-type settings in a second data archive.

To unarchive each object, some embodiments identify the object's settings in one or both of the data archives. These embodiments then instantiate the object, and retrieve the object's first and second type settings from the data archives. These embodiments then use the retrieved settings to define the values of the settings of the instantiated object. Some embodiments use key-value coding techniques to retrieve values and load values in an object. Key-value coding allows an archiving or unarchiving process to retrieve setting values from and to load setting values in an object by simply using the setting names.

In some embodiments of the invention, the settings of an object include the object's attributes and/or relationships. An object's attributes typically specify data primitives (e.g., an integer, a string, etc.) of the object, while an object's relationships typically specify references to other objects. Attributes are typically stored in non-referencing data variables (e.g., an integer variable, a string variable, etc.) of the object, while an object's relationships are typically stored in referencing variables (e.g. a pointer variable to another object).

BRIEF DESCRIPTION OF THE DRAWINGS

The novel features of the invention are set forth in the appended claims. However, for purpose of explanation, several embodiments of the invention are set forth in the following figures.

FIG. 1 illustrates an object that has global and user attributes.

FIG. 2 illustrates how one embodiment of the invention archives objects that have global and users attributes.

DETAILED DESCRIPTION OF THE INVENTION

In the following description, numerous details are set forth for purpose of explanation. However, one of ordinary skill in the art will realize that the invention may be practiced without the use of these specific details. In other instances, well-known structures and devices are shown in block diagram form in order not to obscure the description of the invention with unnecessary detail.

The invention is directed towards methods and apparatuses for archiving and unarchiving objects. Some embodiments of the invention archive and unarchive objects that have global and user settings. Such objects can be found in multi-user environments that allow individual users to define certain object settings (i.e., define user-specific settings) uniquely for themselves, while defining other object settings (i.e., defining global settings) uniformly for all users.

Figure 3:
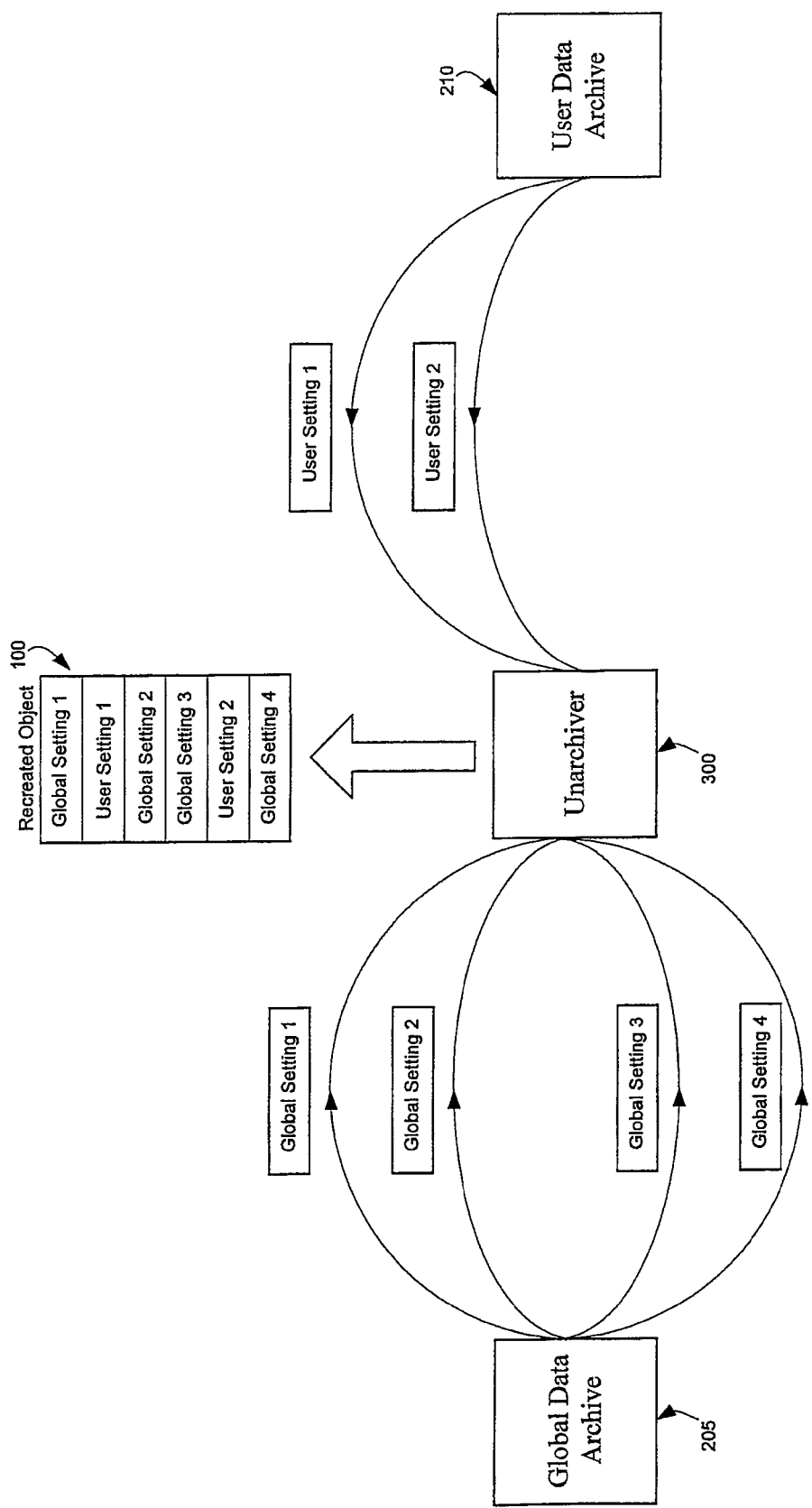
FIG. 3 illustrates how one embodiment of the invention unarchives global and user attributes to reconstruct an object.

FIGS. 1-3 conceptually illustrate one embodiment of the invention. FIG. 1 pictorially illustrates an object 100 that has global and user settings (i.e., global and user attributes and/or relationships). As shown in FIG. 2, an archiver 200 archives the object 100 by storing the object's global settings in a global data archive 205 and storing the object's user settings in a user data archive 210. As shown in FIG. 3, an unarchiver 300 can reconstruct the object 100 at a later time, by instantiating the object and then using the global and user data in the archives 205 and 210 to define the global and user settings of the instantiated object 100.

FIGS. 4-10 illustrate more specific embodiments of the invention. These embodiments are implemented by using Enterprise Object Framework ("EOF") and the Objective C programming language. However, one of ordinary skill in the art will understand that the invention can be implemented without EOF and/or with other OOP languages.

EOF adds the capability of key-value coding to Objective C objects. Key-value coding provides a mechanism for loading data in, and retrieving data from, an object. U.S. Pat. No. 5,898,871 describes this coding scheme and its mechanism for loading and reading data from the objects. This patent is incorporated herein by reference.

Generally, key-value coding allows an archiver to retrieve the value for a particular attribute or relationship from an object by simply using the name of the attribute or relationship. Analogously, key-value coding allows an unarchiver to load the values for a particular attribute or relationship in an object by simply using the name of the attribute or relationship.

In other words, key-value coding allows each object to be viewed as a dictionary of key-value pairs, with each pair representing either an attribute or a relationship. Each pair includes a key and the value for that key. The key refers to the name of the attribute or relationship, while the key's value refers to information stored in the attribute or relationship. For example, an object's attribute might be its "Color," and the value for this attribute might be "Orange." In key-value coding, the object can store this pair as: Key=Color, Value=Orange. It should be noted that key-value coding makes no assumption as to how an object retrieves a value for a key. The object can either store or derive the value for the key.

In the embodiments illustrated in FIGS. 4-10, each particular object implements two descriptive methods, one that returns its object's global attribute keys (i.e., returns the names of the object's globally-defined attributes) and one that returns its object's user-specific attribute keys (i.e., returns the names of the object's user-specific attributes). In these embodiments, the archiver then uses key-value coding techniques to retrieve the values for the returned global and user-specific attribute keys from the particular object.

Some of these embodiments also include two other methods in each particular object. One of these methods returns the object's global relationship keys (i.e., returns the names of the object's global relationships), and the other returns the object's user-specific relationship keys (i.e., returns the names of the object's user relationships). In these embodiments, the archiver then uses key-value coding to retrieve values for the global and user relationship keys from the object. As further described below, these retrieved relationship values identify other objects that need to be archived.

One of ordinary skill will understand that other embodiments of the invention do not use these four descriptive methods to return the global and user keys. For instance, some embodiments use auxiliary data structures to return the global and user keys to the archiver.

Figure 4:
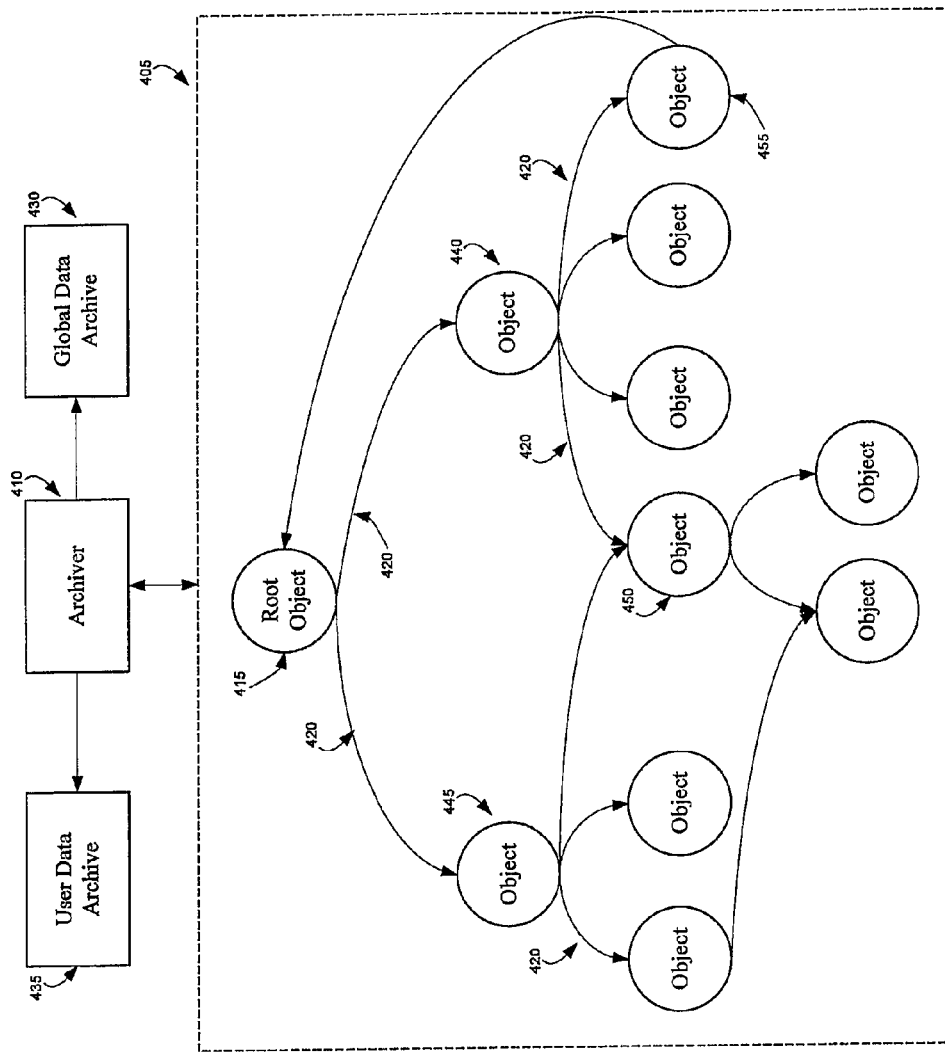
FIG. 4 illustrates an archiver archiving objects in an object web.
Figure 7:
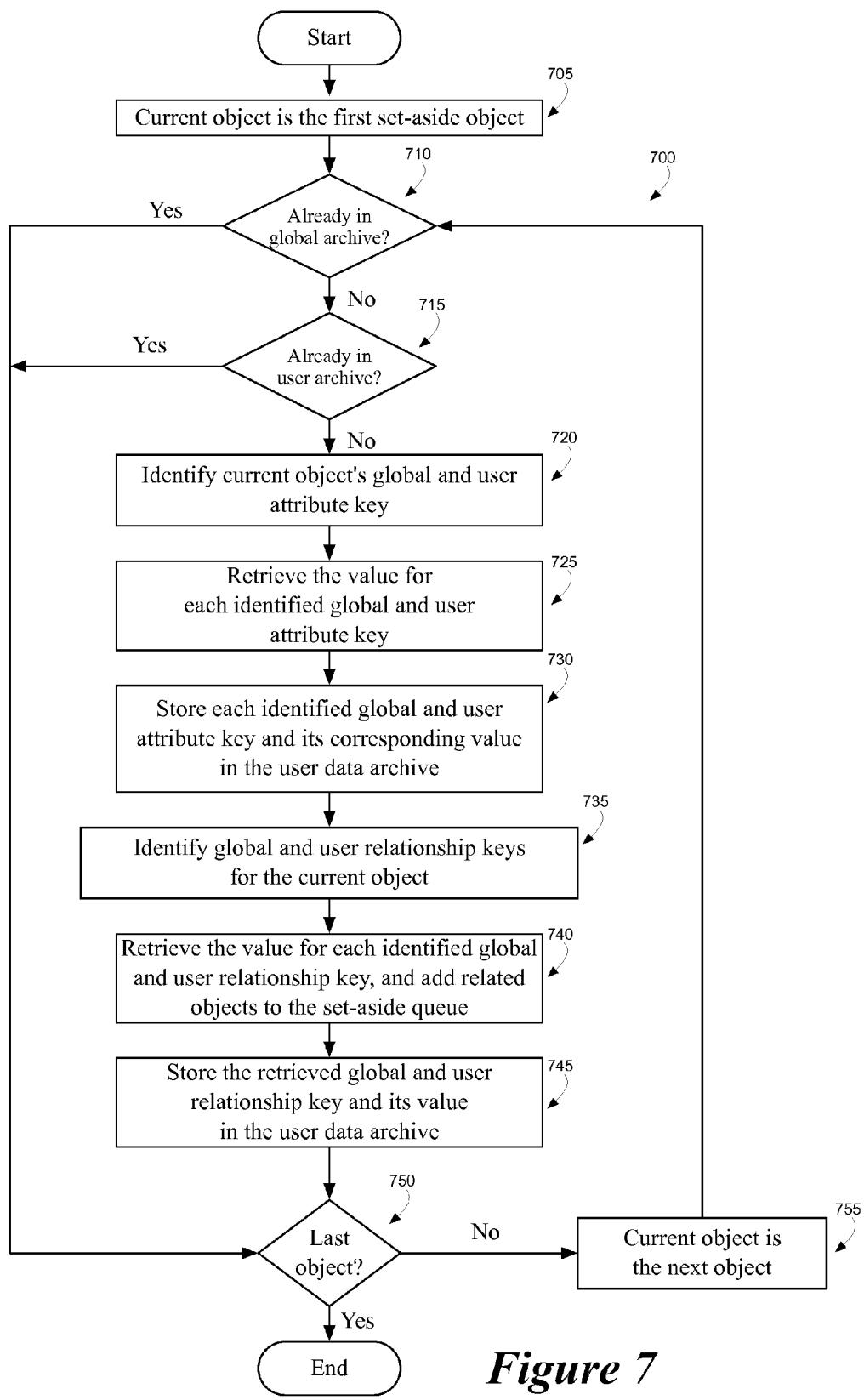
FIG. 7 illustrates a process for archiving the global and user settings of objects that are only identified through user relationships.
Figure 8:
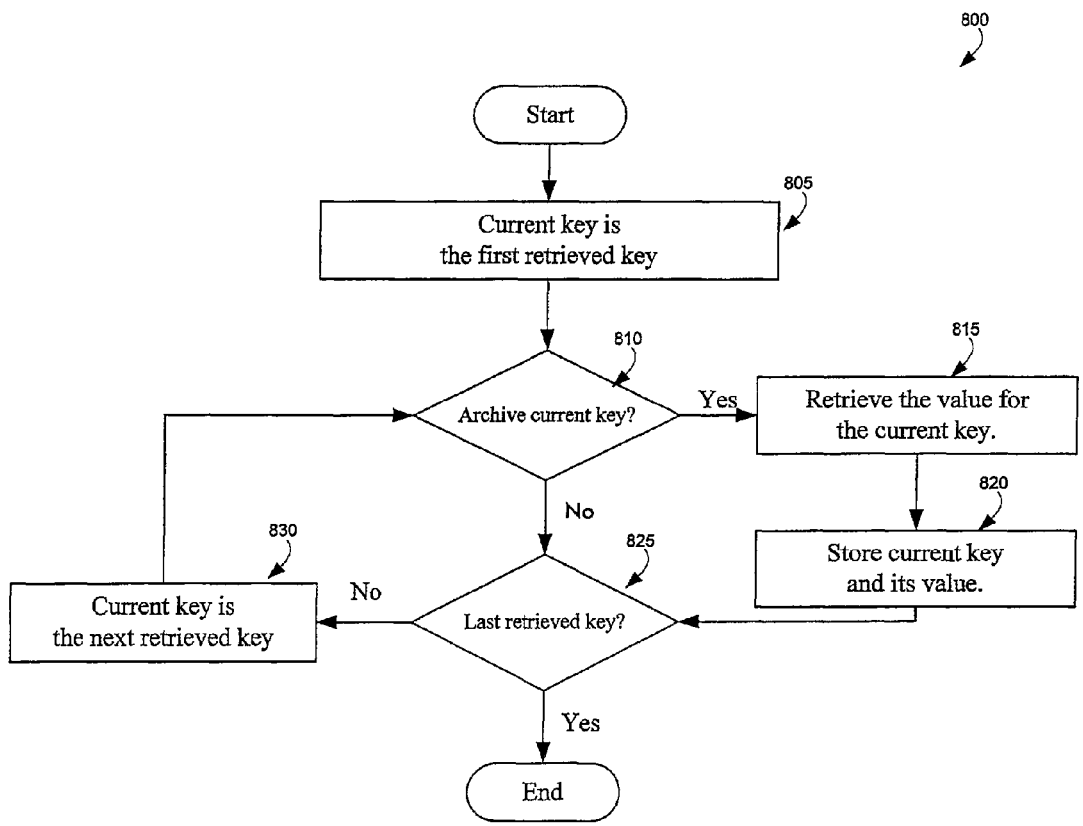
FIG. 8 illustrates an instance level override operation.
Figure 9:
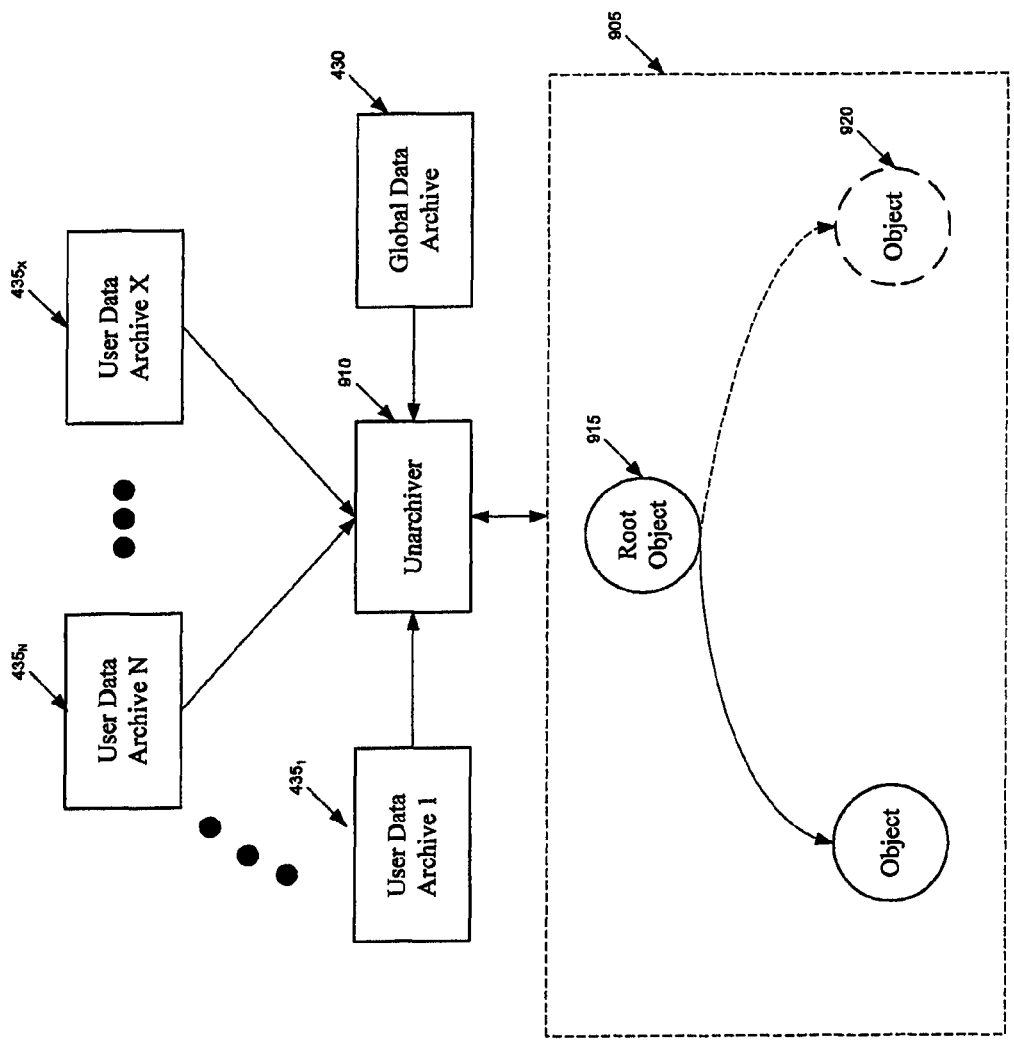
FIG. 9 illustrates an unarchiver that reconstructs objects from the information stored in the global and user data archives.

FIGS. 4-8 explain the archiving process used by some embodiments of the invention, while FIG. 9 explains the unarchiving process used by these embodiments. FIG. 4 pictorially illustrates an object web 405, an archiver module 410, a global data archive 430, and a user data archive 435.

The object web specifies the relationship among several objects that the archiver needs to archive. This web includes a number of nodes and branches. Each node represents an object, and each branch 420 represents a relationship between two objects in the web. A pointer from one object to another can specify such a relationship. An object 415 serves as the root object of the web. In some embodiments of the invention, this root object serves as the starting point for the archiving process. In other embodiments, several root objects define multiple start points for the archiving process. Multiple root objects can be used when several distinct or interconnected webs specify the relationships between the objects.

In an object web, multiple objects can point to one object. For instance, as shown in FIG. 4, objects 440 and 445 point to object 450. In addition, as shown by object 455 pointing to object 415, lower level objects can point to higher-level objects in an object web. In other words, an object web can have cycles (i.e., loops).

In some embodiments of the invention, the objects in the web 405 collectively define a multi-user document. In these embodiments, the objects can have global and user attributes and relationships (i.e., global and user settings). Specifically, in these embodiments, there are three types of objects. These three types are: (1) objects that are identified through global relationships and that only have global settings, (2) objects that are identified through global relationships and that have both global and user settings, and (3) objects that are only identified through user relationships.

The archiver 410 traverses the object web 405, and archives these objects in the global and user data archives 430 and 435. In particular, the archiver traverses the object web by using the values of the global and user relationships to identify other objects that it needs to archive. As the archiver traverses the tree, it stores the global settings of the first object type (i.e., the globally-identified objects that only have global attributes) and the second object type (i.e., the globally-identified objects that have global and user attributes) in the global data archive 430.

The archiver 410 stores the user settings of the second object type in the user data archive 435, which is separate from the global data archive 430. In the user data archive 435, the archiver also stores the global and user settings of the third object type (i.e., the objects that are only identified through user relationships). In some embodiments of the invention, the archiver 410 initially archives the global settings of the first and second object types. It then archives the user settings of the second object type and the settings of the third object type. Also, in some embodiments, the data archives 430 and 435 are separate data files. In some embodiments, the data archives are stored as a text-based property list (i.e., stored in a text-based format). Other embodiments, however, use other data archives. For instance, some embodiments store the data archives in a binary format.

Figure 5:
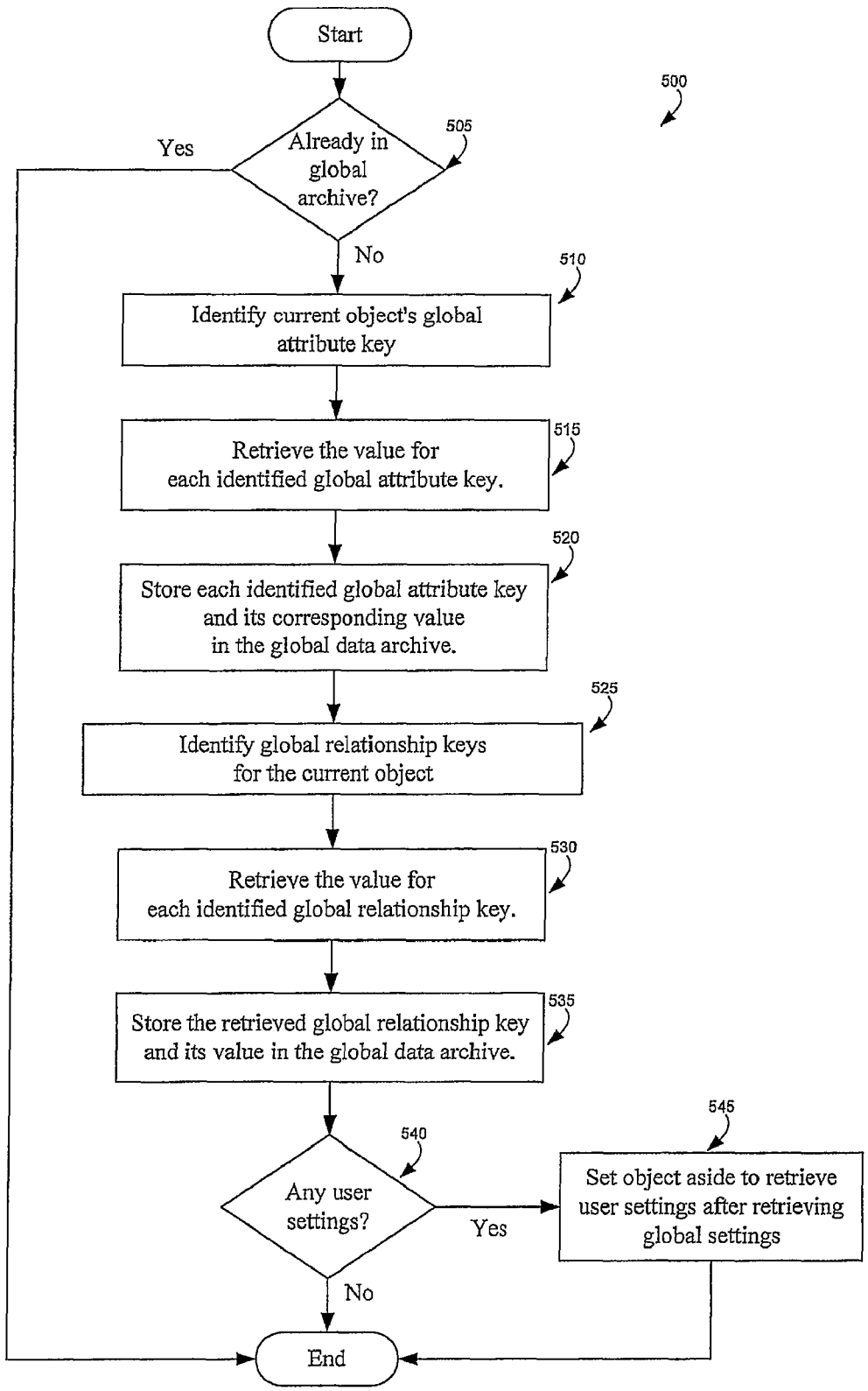
FIG. 5 illustrates a process for archiving global settings of an object.

FIG. 5 illustrates a process 500 that the archiver performs for archiving the global settings of the first and second object types. The archiver performs the process 500 for each object in the object web 405. In some embodiments, the archiver initially performs the process 500 for the root-node object 415 whenever a user or another program commands it to save the global and user settings of the objects. The archiver then performs this process 500 repetitively or recursively for each object in the object web that the process identifies while archiving other objects. As described below, the archiver identifies these other objects from the values of the global and user relationships that the archiver archives.

After starting, the process initially determines (at 505) whether the current object (i.e., the object that the process is archiving in its current pass) has already been archived in the global data archive 430. Some embodiments specify each object by its own unique object identifier (e.g., a unique 128-bit identifier). In some of these embodiments, the process 500 determines whether the current object's global settings have already been archived, by ascertaining whether the object's unique identifier has been inserted into the global data archive 430.

If the current object's global settings have already been archived, the process 500 terminates. Otherwise, the process identifies (at 510) the names of the global attributes (i.e., identifies the global attribute keys) of the current object. In some embodiments of the invention, the process identifies these global keys through an archivableAttributes method of the current object. This method returns a declarative structure that contains the global attribute keys of its object. In some embodiments, this method returns the global attribute keys in an array.

Next, the process retrieves (at 515) from the current object the value for each retrieved global attribute key. In some embodiments of the invention, the process 500 retrieves (at 515) the values by using commonly known key-value coding techniques, such as those disclosed in U.S. Pat. No. 5,898,871. For example, for a particular retrieved key called "foo," some embodiments search the object's class description for the following methods and instance variables: (1) a method called "_getFoo," (2) a method called "_foo," (3) an IVAR called "_foo," (4) an IVAR "foo," (5) a method "getFoo," and (6) a method "foo." Some of these embodiments search for these methods and IVAR's in the order listed above. In these embodiments, if the process 500 finds one of these methods, it invokes the method to retrieve the value of the particular key from this method. On the other hand, if the process 500 first encounters one of the IVAR's described above, the process receives the IVAR's value as the key's value.

After obtaining (at 515) values for each retrieved global attribute key, the process 500 stores (at 520) each retrieved global attribute key and its corresponding value in the global data archive 430. Next, the process 500 identifies (at 525) the current object's global relationship keys. In some embodiments, the process 500 identifies the global relationship keys through an archivableRelationships method of the current object. This method returns a declarative structure that contains the global relationship keys of the current object.

The process 500 then retrieves (at 530) values for the identified global relationship keys from the current object. In some embodiments, pointers from the current object to other objects define the current object's global relationships. In these embodiments, the process uses a two-step approach to retrieve the value for each identified global relationship key.

First, the process uses key-value coding techniques to retrieve the relationship key's pointer value, which specifies the related object's location in the memory. Second, the process asks the related object for its unique object identifier. The process uses this unique object identifier as the value for the global relationship key in the global data archive 430. The process 500 stores (at 535) the retrieved global relationship keys and values in the global data archive 430.

The process 500 identifies and archives the global relationships for two reasons. First, through the global relationships, the process identifies other objects that it needs to archive. In other words, the process identifies the global relationships in order to traverse the object web 405 and archive the global and user settings of each object in this tree. Second, the process 500 identifies the current object's global relationships in order to archive the unique identifier of the related objects for later restoration of the relationship during the unarchiving process.

After storing the current object's global relationship keys and values, the process 500 determines (at 540) whether the current object has any user settings (i.e., any user attributes or relationships). In some embodiments, the process makes this determination by asking the object to call a boolean method called hasUserSettings.

If the process determines (at 540) that the current object has user settings, the process specifies (at 545) the current object as an object that has user settings which need to be archived. In some embodiments, the process specifies the current object by putting the current object in an array of objects. In some of these embodiments, this array is a pointer array, where each pointer points to a location in the memory that contains an object with user settings. As further described below, process 600 of FIG. 6 then archives the user settings of each object in this array. After specifying (at 545) the current object for archiving its user settings, the process 500 terminates.

The process also terminates if it determines (at 540) that the current object does not have any user settings. As mentioned above, the archiver performs this process 500 for each globally related object that the process identifies (at 530). Some embodiments recursively perform this process for each globally-related object, while other embodiments iteratively perform this process for each globally-related object.

Figure 6:
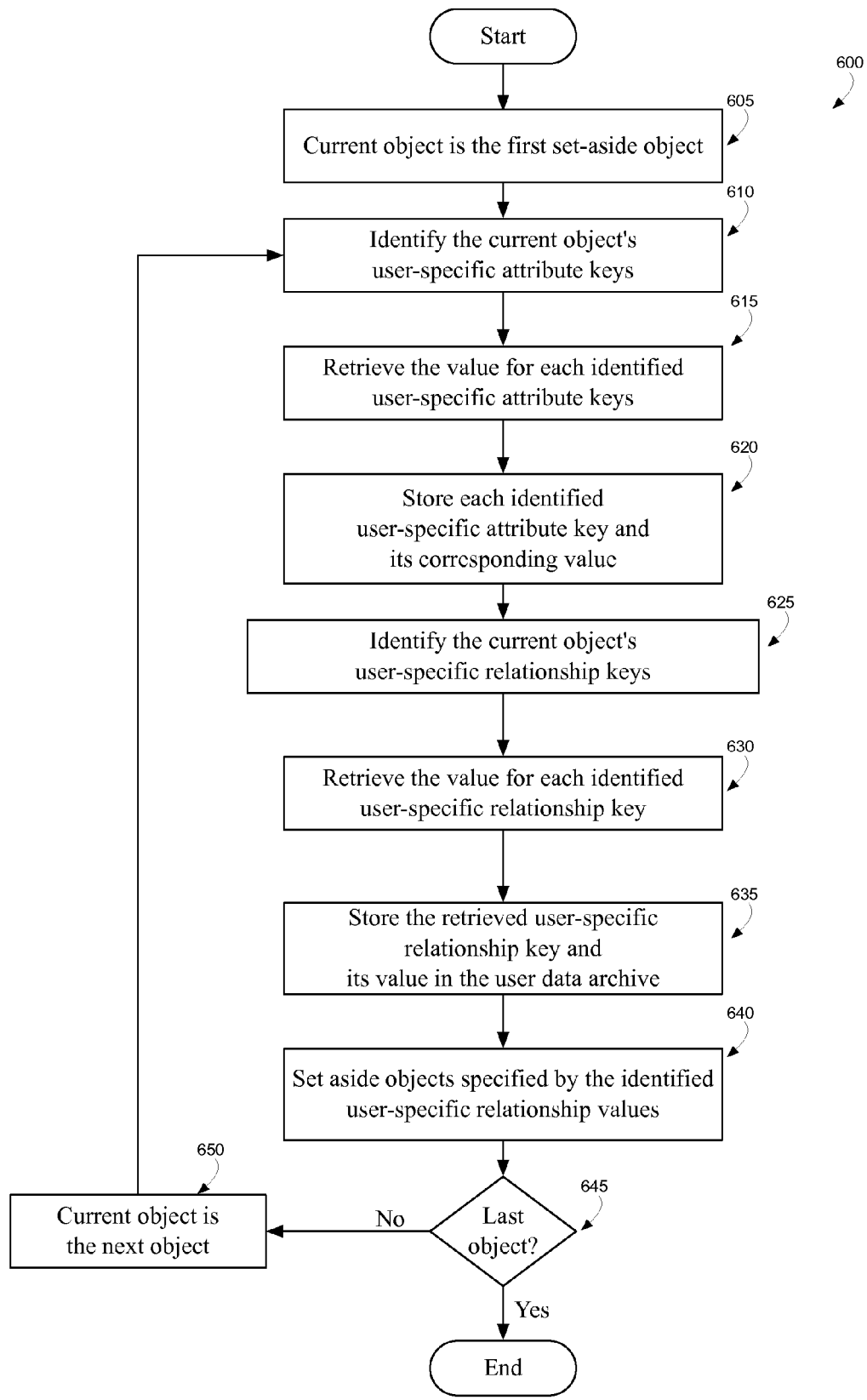
FIG. 6 illustrates a process for archiving user settings of an object.

FIG. 6 illustrates a process 600 that the archiver performs for storing the user settings of the objects specified (at 545) by process 500. Some embodiments of the invention perform process 600 after the archiver repetitively or recursively performs process 500 for all objects in the object web 405.

As shown in FIG. 6, the process 600 initially defines (at 605) the current object as the first object specified (at 545) by process 500. Next, the process 600 identifies (at 610) the current object's user-specific attribute keys. In some embodiments of the invention, the process identifies these keys through an archivableUserAttributes method of the current object. This method returns a declarative structure that contains the current object's user-specific attribute keys. In some embodiments, this method returns these keys in an array.

The process 600 then retrieves (at 615) the value for each user-specific attribute key identified at 610. In some embodiments, the process 600 retrieves these values by using commonly known key-value coding techniques, such as those described above and disclosed in U.S. Pat. No. 5,898,871.

After obtaining (at 615) values for each identified user-specific attribute key, the process 600 stores (at 620) each retrieved user-specific attribute key and its corresponding value in the user data archive 435. Next, the process 600 identifies (at 625) the current object's user-specific relationships with other objects. In some embodiments, the process 600 identifies the user-specific relationship keys through an archivableUserRelationships method of the current object. This method returns a declarative structure that contains the current object's user-specific relationship keys.

The process 600 then retrieves (at 630) values for the identified user-specific relationship keys from the current object. In some embodiments, pointers from the current object to other objects define the current object's user-specific relationships. In these embodiments, the process uses a two-step approach to retrieve the value for each identified user-specific relationship key. First, the process uses key-value coding techniques to retrieve the relationship key's pointer value, which specifies a user-related object's location in the memory. Second, the process asks the specified user-related object for its unique object identifier. The process uses this unique object identifier as the value for the user-specific relationship key in the user data archive 435.

Next, the process 600 stores (at 635) the retrieved user-specific relationship keys and values in the user data archive 435. The process 600 identifies and archives the user-specific relationships for two reasons. First, the process 600 identifies the current object's user-specific relationships in order to archive (at 635) the unique identifier of the related objects for later restoration of the relationship during the unarchiving process.

Second, the user-specific relationships might identify the objects that were not specified by the global relationships that the process 500 identified at 525 and 530. In other words, the user-specific relationships might identify objects that are only specified by user relationships (i.e., identify the third type of objects described above). As mentioned above, the archiver needs to archive these objects as well.

To this end, the process 600 sets aside (at 640) all the objects specified by the identified user-specific relationship values. As described below, process 700 of FIG. 7 then receives these set-aside objects, and archives the objects that were not previously archived. In some embodiments, the process 600 sets aside (at 640) the objects by putting them in an array of objects. In some of these embodiments, this array is a pointer array, where each pointer points to a location in the memory that contains an object specified by a user-specific relationship.

After setting aside the objects identified by the user-specific relationships, the process 600 determines (at 645) whether the current object is the last object specified by process 500 at 535. If so, the process ends. If not, the process defines (at 650) the current object to be the next object specified at 535, and then repeats 610-645 for this next object.

FIG. 7 illustrates a process 700 that archives the global and user settings of objects that are only identified through user relationships. To archive these objects, this process reviews all the objects that the process 600 sets aside at 640. The process 700 initially specifies (at 705) the current object as the first object specified (at 640) by process 600.

The process then determines (at 710) whether the current object has already been entered in the global archive. In some embodiments, the process makes this determination by ascertaining whether the objects unique identifier was inserted into the global data archive 430. If the current object has already been entered in the global archive, that object is a second type object, which processes 500 and 600 have already archived. Hence, the process 700 transitions to 750, which is described below.

On the other hand, if the current object has not been entered in the global archive, the process 700 determines (at 715) whether the current object has been entered in the user archive. In some embodiments, the process makes this determination by ascertaining whether the object's unique identifier was inserted into the user data archive 435. If so, the process transitions to 750.

If not, the process identifies (at 720) the current object's global and user attribute keys. In some embodiments of the invention, the process identifies these global keys through the current object's archivableAttributes and archivableUserAttributes methods described above.

Next, the process retrieves (at 725) from the current object the value for each identified global and user attribute key. In some embodiments of the invention, the process 700 retrieves (at 725) the values by using commonly known key-value coding techniques, such as those described above.

The process 700 then stores (at 730) each retrieved global and user attribute key and its corresponding value in the user data archive 435. Next, the process 700 identifies (at 735) the current object's global and user relationship keys. In some embodiments, the process 700 identifies the global and user relationship keys through the archivableRelationships and archivableUserRelationships methods described above.

The process 700 then retrieves (at 740) values for the identified global and user relationship keys from the current object. To retrieve a value for a relationship key, the process initially (1) uses key-value coding to retrieve the relationship key's pointer value, which specifies the related object's location in the memory, and then (2) asks the related object for its unique object identifier. The process uses this unique object identifier as the value for the relationship key in the user data archive 435. The process also inserts (at 740) the related object into the object set-aside queue that it reviews.

Next, the process 700 stores (at 745) the retrieved global and user relationship keys and their corresponding values in the user data archive 435. The process 700 then determines (at 750) whether the current object is the last object in its object set-aside queue. If so, the process ends. If not, the process defines (at 755) the current object to be the next object in the queue, and then repeats 710-750 for this next object.

In some embodiments of the invention, the four declarative methods described above (i.e., archivableAttributes, archivableUserAttributes, archivableRelationships, and archivableUserRelationships) are class methods. Hence, the processes 500, 600, and 700 call these methods once for each class, cache the results, and use the results for each object in that class. When these processes encounter an object of a new subclass, the processes determine whether the new subclass adds any keys, and if so, cache those keys. These embodiments use class declarative methods in order to increase the processing speed and memory efficiency, by eliminating the need to allocate memory for retrieving attributes for all objects in the object web.

Also, in some embodiments, each object can override the archiving of particular global or user settings. FIG. 8 illustrates one such instance-level override operation that allows the archiver to skip the archiving of particular key-value pairs. This operation can be performed for overriding the archiving of global or user attributes or relationships. The instance-level override operation reduces the size of the global and user archives by allowing the objects to designate the global and user settings that they do not want to archive. Typically, objects override the archiving of their settings that have retained their default values, in order to conserve memory space.

The process 800 typically starts after a set of keys have been identified (e.g., starts after 510, 525, 610, 625, 720, and 735 in FIGS. 5-7). After retrieving the set of keys, the process 800 defines (at 805) a current key to be the first retrieved key. The process then determines (at 810) whether it should archive the current key.

In some embodiments, the process 800 makes this determination by initially determining whether the current object has a boolean method called shouldArchive[Key]. The process ascertains whether the object has this method by using commonly known key-value coding techniques. If the object does not have this method, the process has to archive the current key. If the object has this method, the process then asks the current object to call this method, which returns TRUE to signify that the process should archive the current key or FALSE to signify that the process should not archive the current key.

If the process determines (at 810) that it does not need to archive the current key, the process transitions to 825. Otherwise, the process retrieves (at 815) the value for the current key, stores (at 820) the current key and its value in the appropriate data archive, and then transitions to 825. At 825, the process determines whether it has examined all the retrieved keys. If so, the process ends. Otherwise, the process sets (at 830) the current key to be the next retrieved key, and transitions back to 810.

FIG. 9 illustrates a reconstructed object web 905, an unarchiver module 910, a global data archive 430, and several user data archives 435. The unarchiver 910 reconstructs the archived objects for a particular user N by retrieving the global and user settings from the global data archive 430 and user data archive $435_N$.

When the unarchiver reconstructs an object, it not only sets the object's global and user attributes, but also establishes the object's relationships to other objects. In other words, the unarchiver also reconstructs the object web 905. By way of example, FIG. 9 uses dashed lines to illustrate the instantiation of an object 920, and the linking of this object to the root-node object 915.

Figure 10:
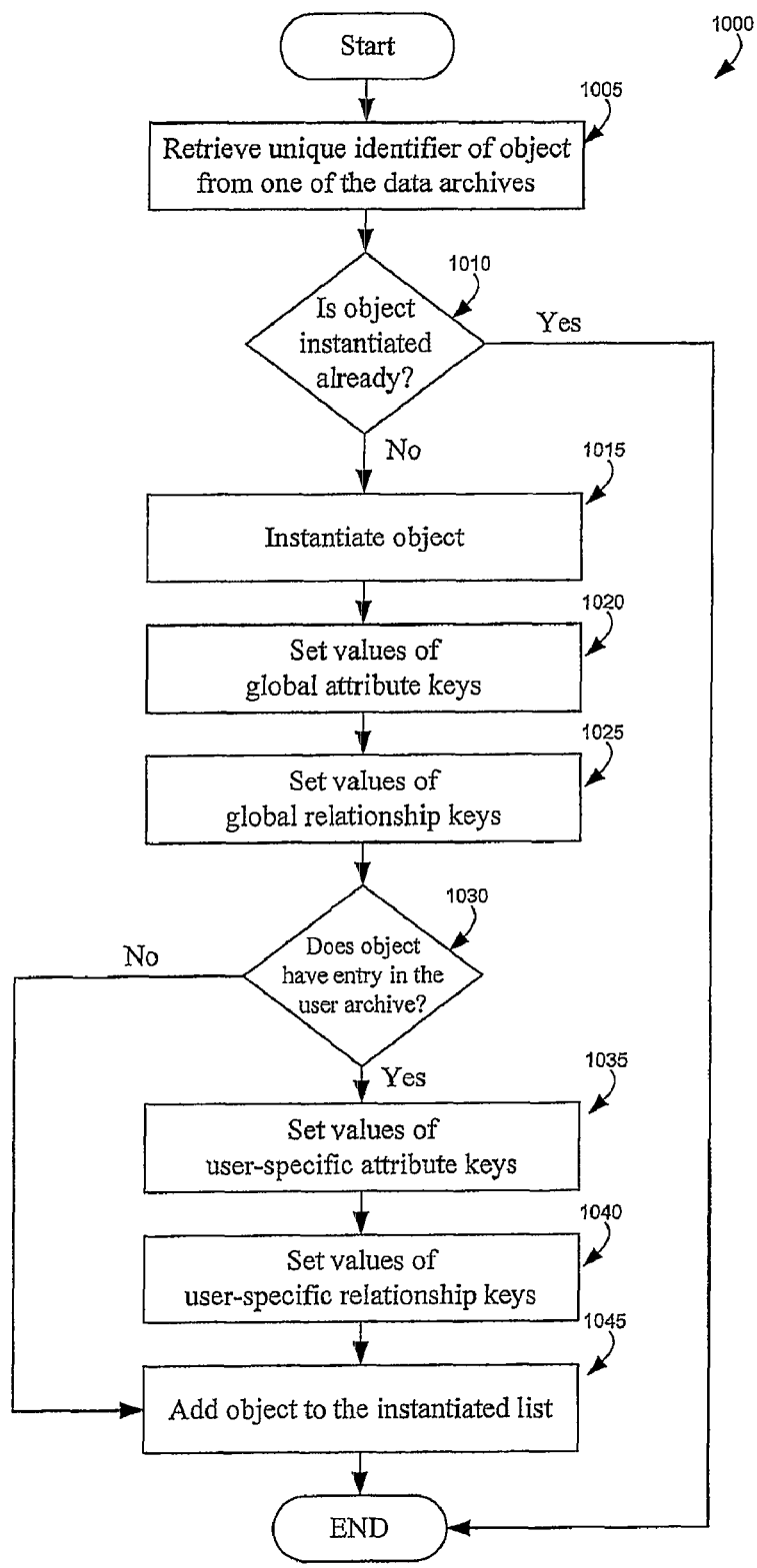
FIG. 10 illustrates a process for unarchiving objects stored in the global and user archives.

FIG. 10 illustrates a recursive process 1000 for unarchiving objects stored in the global and user archives. This process is initially performed on the root-node object, and then it is recursively performed on each globally related object. The process 1000 initially retrieves (at 1005), from either the global or user data archives, the unique identifier of the current object (i.e., the object that the process 1000 unarchives in the current pass). In its first pass, the unarchiving process 1000 starts by retrieving the unique identifier of the root node object from the global data archive.

Next, the process determines (at 1010) whether it previously instantiated the current object. As described below, the process makes this determination in some embodiments by ascertaining whether the object's unique identifier is on a list of instantiated objects that the process maintains. If so, the process terminates it current pass.

Otherwise, the process instantiates (at 1015) the current object. If the current object has global attribute keys, the process (at 1020) then (1) retrieves the current object's global attribute keys and values from the global data archive, (2) deletes the retrieved keys and values from the global data archive, and (3) set these retrieved values as the values of the global attribute keys of the instantiated object.

In some embodiments of the invention, the process 1000 sets the key values by using commonly known key-value coding techniques, such as those disclosed in U.S. Pat. No. 5,898,871. For example, to set a particular key called "foo," some embodiments search the object's class description for the following methods and instance variables: (1) a method called "_setFoo," (2) an IVAR called "_foo," (3) an IVAR "foo," and (4) a method "setFoo." Some of these embodiments search for these methods and IVAR's in the order listed above. In these embodiments, if the process 1000 finds one of these methods, it invokes the method and passes the retrieved value of the particular key as an argument to this method. On the other hand, if the process 1000 first encounters one of the IVAR's described above, the process sets the IVAR's value to equal the retrieved value of the particular key.

If the current object has global relationship keys, the process (at 1025) (1) retrieves the current object's global relationship keys and values from the global data archive, (2) deletes the retrieved keys and values from the global data archive, and (3) uses the retrieved values to set the global relationship keys of the instantiated current object. To set these relationship keys, the process 1000 recursively repeats for the globally-related objects, which are identified by the retrieved values of the current object's global relationship keys. Once the globally-related objects have been instantiated, the process sets the values of the current instantiated object's global relationship keys to point to the location in the memory that stores the instantiated globally-related objects. In some embodiments, the process 1000 sets the values of the current instantiated object's global relationship keys by using key-value coding techniques.

Next, the process determines (at 1030) whether the current object has any settings in the user data archive 435. If not, the process transitions to 1045. Otherwise, if the current object has user-specific attribute keys, the process (at 1035) (1) retrieves the current object's user-specific attribute keys and values from the user data archive, (2) deletes the retrieved keys and values from the user data archive, and (3) set these retrieved values as the values of the user-specific attribute keys of the instantiated object. In some embodiments, the process 1000 sets the values of the current instantiated object's user-specific attribute keys by using key-value coding techniques.

Also, if the current object has user-specific relationship keys, the process (at 1040) (1) retrieves the current object's user-specific relationship keys and values from the user data archive, (2) deletes the retrieved keys and values from the user data archive, and (3) uses the retrieved values to set the user-specific relationship keys of the current instantiated object. To set these relationship keys, the process 1000 recursively repeats for the user-related objects, which are identified by the retrieved values of the current object's user-specific relationship keys. Once the user-related objects have been instantiated, the process sets the values of the instantiated object's user-specific relationship keys to point to the location in the memory that stores the instantiated user-related objects. In some embodiments, the process 1000 sets the values of the current instantiated object's user-specific relationship keys by using key-value coding techniques.

At 1045, the process adds the unique identifier of the current object to a list of instantiated objects that it maintains. The process then terminates its current pass.

Figure 11:
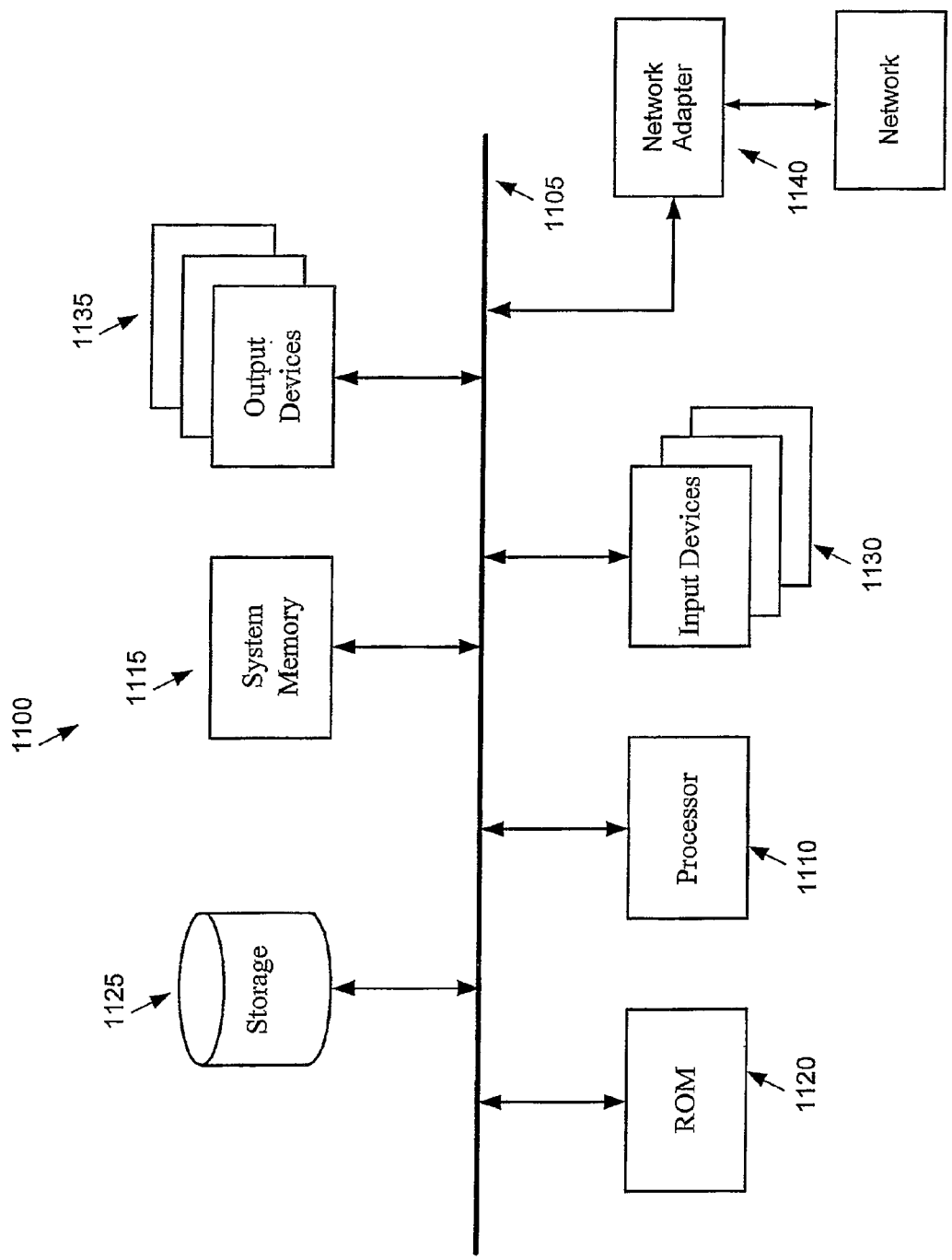
FIG. 11 illustrates a computer used in some embodiments of the invention.

FIG. 11 presents a computer 1100 that is used in some embodiments of the invention. This computer 1100 includes a bus 1105, a processor 1110, a system memory 1115, a read-only memory 1120, a permanent storage device 1125, input devices 1130, and output devices 1135.

The bus 1105 collectively represents all system, peripheral, and chipset buses that communicatively connect the numerous internal devices of the computer 1100. For instance, the bus 1105 communicatively connects the processor 1110 with the read-only memory 1120, the system memory 1115, and the permanent storage device 1125. From these various memory units, the processor 1110 retrieves instructions to execute and data to process.

The read-only-memory (ROM) 1120 stores static data and instructions that are needed by the processor 1110 and other modules of the computer. The permanent storage device 1125, on the other hand, is read-and-write memory device. This device is a non-volatile memory unit that stores instruction and data even when the computer 1100 is off. Some embodiments of the invention use a mass-storage device (such as a magnetic or optical disk and its corresponding disk drive) as the permanent storage device 1125. Other embodiments use a removable storage device (such as a floppy disk or Zip® disk, and its corresponding disk drive) as the permanent storage device. In some embodiments of the invention, the permanent storage device stores the global and user data archives.

Like the permanent storage device 1125, the system memory 1115 is a read-and-write memory device. However, unlike storage device 1125, the system memory is a volatile read-and-write memory, such as a random access memory. The system memory stores some of the instructions and data that the processor 1110 needs at runtime. In some embodiments, the invention's processes are stored in the system memory, the permanent storage device 1125, and/or the read-only memory 1120.

The bus 1105 also connects to the input and output devices 1130 and 1135. The input devices enable the user to communicate information and select commands to the computer. The input devices 1130 include an alphanumeric keyboard and a cursor-controller (such as a mouse or a touch-pad). The output devices 1135 display images generated by the computer. The output devices include printers and display devices, such as cathode ray tubes (CRT) or liquid crystal displays (LCD).

Finally, as shown in FIG. 11, bus 1105 also couples to a network adapter 1140. The network adapter connects the computer 1100 to a network of computers (such as a local area network ("LAN"), a wide area network ("WAN"), or an Intranet) or a network of networks (such as the Internet). One of ordinary skill in the art will appreciate that other embodiments of the invention use computers that have different configurations and/or components than those of the computer 1100 of FIG. 11.

One of ordinary skill in the art will realize that the invention has numerous advantages. For instance, the invention does not require the objects to direct their archiving. At most, in some embodiments, the invention requires each object to inform the archiver of what needs to be archived. The objects do not even need to perform this minimal operation in other embodiments of the invention, which use an auxiliary data structure separate from the objects to specify the object settings that need to be archived.

In some embodiments, the archiver includes the processing logic to retrieve the global and user settings from the objects, and to store the retrieved settings in the global and user data archives. Also, some embodiments of the invention utilize key-value coding to greatly simplify the archiving process, and key-value coding allows the archiver to treat uniformly objects of varying complexities.

One of ordinary skill will also recognize that the invention can be embodied in other specific forms without departing from the spirit of the invention, even though the invention has been described with reference to numerous specific details. For instance, although the invention has been described by reference to embodiments that archive objects that have global and user attributes, one of ordinary skill will realize that other embodiments archive other multi-type objects. The setting types of the objects do not necessarily have to be global and user, but could be global and any other non-global type.

Setting types can also be divided irrespective of whether they are global or not. For instance, some embodiments might divide the setting types into a first platform type (e.g., MAC OS X) or a second platform type (e.g., Windows 2000). Also, some embodiments divide the object setting types into more than two categories. For example, one embodiment might divide the object setting along the following three dimensions: user, platform, and language. These embodiments then archive the objects along these three-dimensions into three data archives. The objects can then be unarchived for a particular user, language, and platform (e.g., for John, in Italian, and for a MAC OS X platform). In addition, some embodiments use parameterized methods that are able to specify at run time the dimensions along which the objects are archived. In view of the foregoing, one of ordinary skill in the art will understand that the invention is not to be limited by the foregoing illustrative details, but rather is to be defined by the appended claims.

We claim:

1. A method of storing a document, the method comprising:
   receiving a command to save a particular multi-user document comprising data that is editable by a plurality of users in a multi-user environment, said particular multi-user document associated with an instantiated software object comprising shared settings that are defined uniformly for the plurality of users and user settings that are defined for a particular user in the plurality of users;
   identifying, in response to the command, the shared and user settings of the instantiated software object that is associated with the particular multi-user document;
   retrieving the shared and user settings of the instantiated software object;
   identifying one or more non-default settings of the shared and user settings;
   storing each non-default shared setting of the instantiated software object in a shared first data store; and
   storing each non-default user setting of the instantiated software object in a user second data store that is different from said shared first data store.

2. The method of claim 1 further comprising:
   identifying relationship information of the instantiated software object, the relationship information referencing another instantiated object in a set of instantiated objects; and
   storing the relationship information in one of the shared first and user second data stores.

3. The method of claim 2, wherein the instantiated software object further comprises a name and value pair associated with the relationship information, wherein identifying the relationship information comprises retrieving the value from the instantiated software object based on the name.

4. The method of claim 1, wherein the instantiated software object further comprises a method that determines whether particular shared and user settings of the instantiated software object are non-default settings, wherein identifying the non-default settings of the instantiated software object comprises invoking said method.

5. The method of claim 2 further comprising using the relationship information to recursively identify each remaining instantiated object in the set instantiated objects.

6. The method of claim 2 further comprising using the relationship information to iteratively identify each remaining instantiated object in the set of instantiated objects.

7. The method of claim 3, wherein identifying the relationship information comprises retrieving the name from an auxiliary data store.

8. The method of claim 1, wherein identifying the shared settings of the instantiated software object comprises identifying the at least one related object.

9. The method of claim 1, wherein the shared settings are global settings.

10. The method of claim 1 further comprising receiving user input to edit the particular multi-user document prior to storing the one or more non-default shared and user settings.

11. The method of claim 1, wherein the shared first data store is a global archive that stores a plurality of global setting values.

12. The method of claim 1, wherein at least one of said shared first and user second data stores is stored in one of a text-based format and a binary format.

13. The method of claim 1, wherein the multi-user document is for editing with an application program.

14. A non-transitory computer readable medium storing a computer program that is executable by at least one processor, the computer program comprising sets of instructions for:
  receiving a command to save a particular multi-user document comprising data that is editable by a plurality of users in a multi-user environment, said particular multi-user document associated with an instantiated software object comprising shared settings that are defined uniformly for the plurality of users and user settings that are defined for a particular user in the plurality of users;
  identifying, in response to the command, the shared and user settings of the instantiated software object that is associated with the particular multi-user document;
  retrieving the shared and user settings of the instantiated software object;
  identifying one or more non-default settings of the shared and user settings;
  storing each non-default shared setting of the instantiated software object in a shared first data store; and
  storing each non-default user setting of the instantiated software object in a user second data store that is different from said shared first data store.

15. The non-transitory computer readable medium of claim 14, wherein the shared first data store is a first data file that stores the settings shared amongst the plurality of users, wherein the user second data store is a second data file that is separate from the first data file and stores the settings for the particular user.

16. The non-transitory computer readable medium of claim 14, wherein the computer program further comprises sets of instructions for:
  identifying a relationship information from the instantiated software object, the relationship information referencing at least one other instantiated object associated with the particular multi-user document;
  retrieving the relationship information from the instantiated software object;
  determining whether the relationship information relates to a global relationship or a user relationship;
  storing the relationship information in the shared first data store when the relationship information relates to the global relationship; and
  storing the relationship information in the user second data store when the relationship information relates to the user relationship.

* * * * *